(12) United States Patent
Singh et al.

(10) Patent No.: US 10,114,982 B2
(45) Date of Patent: Oct. 30, 2018

(54) METHOD AND SYSTEM FOR DETERMINING AND IMPLEMENTING A VIABLE CONTAINMENT DESIGN OF A DATA CENTER

(71) Applicant: Tata Consultancy Services Limited, Maharashtra (IN)

(72) Inventors: Umesh Singh, Maharashtra (IN); Amarendra K Singh, Maharashtra (IN); Anand Sivasubramaniam, Tamilnadu (IN)

(73) Assignee: TATA CONSULTANCY SERVICES LIMITED, Maharashtra (IN)

(*) Notice: Subject to any disclaimer, the term of this patent is extended or adjusted under 35 U.S.C. 154(b) by 574 days.

(21) Appl. No.: 14/401,978

(22) PCT Filed: Mar. 22, 2013

(86) PCT No.: PCT/IN2013/000191
§ 371 (c)(1),
(2) Date: Nov. 18, 2014

(87) PCT Pub. No.: WO2013/171757
PCT Pub. Date: Nov. 21, 2013

(65) Prior Publication Data
US 2015/0100297 A1    Apr. 9, 2015

(30) Foreign Application Priority Data
May 18, 2012    (IN) .......................... 1527/MUM/2012

(51) Int. Cl.
*G06G 7/62*    (2006.01)
*G06F 9/455*   (2018.01)
*G06Q 10/06*   (2012.01)

(52) U.S. Cl.
CPC ............... *G06G 7/62* (2013.01); *G06F 9/455* (2013.01); *G06Q 10/06* (2013.01)

(58) Field of Classification Search
CPC ........... G06F 9/455; G06Q 10/06; G06G 7/62
(Continued)

(56) References Cited

U.S. PATENT DOCUMENTS 7,419,672 B2   9/2008   Hughes et al.
7,885,795 B2   2/2011   Rasmussen et al.
(Continued)

FOREIGN PATENT DOCUMENTS

WO    WO2006/119248 A2    11/2006

OTHER PUBLICATIONS

Demetriou, Dustin W., "Thermally Aware, Energy-Based Techniques for Improving Data Center Energy Efficiency", Mechanical and Aerospace Engineering—Dissertations, 2012, 1-399 (Year: 2012).*
(Continued)

*Primary Examiner* — Aniss Chad
*Assistant Examiner* — Justin C Mikowski
(74) *Attorney, Agent, or Firm* — Shumaker, Loop & Kendrick, LLP

(57) ABSTRACT

A method and system is provided for determining a viable containment design of a data center and systematic implementation of the determined containment design in the data center. Particularly, disclosed is a method and system for collecting data pertaining to the design and operational parameters of the data center; enabling various containment design options using CFD based methodology; and providing recommendations for a viable containment design and assisting systematic implementation of the recommendations of in the data center following an iterative procedure.

12 Claims, 7 Drawing Sheets

(58) Field of Classification Search
USPC .......................................................... 703/21
See application file for complete search history.

(56) References Cited

U.S. PATENT DOCUMENTS

| | | | |
|---|---|---|---|
| 7,991,592 B2 | 8/2011 | VanGilder et al. | |
| 8,184,435 B2 | 5/2012 | Bean et al. | |
| 8,209,056 B2 | 6/2012 | Rasmussen et al. | |
| 8,249,825 B2 | 8/2012 | VanGilder et al. | |
| 8,306,794 B2 | 11/2012 | Hamann | |
| 8,655,610 B2 | 2/2014 | Dasgupta et al. | |
| 8,701,737 B2 | 4/2014 | Mainers et al. | |
| 2007/0078635 A1* | 4/2007 | Rasmussen | G06F 1/20 703/1 |
| 2008/0174954 A1* | 7/2008 | VanGilder | H05K 7/20836 361/679.54 |
| 2009/0326879 A1* | 12/2009 | Hamann | G06F 1/206 703/2 |
| 2010/0061057 A1 | 3/2010 | Dersch et al. | |
| 2010/0199267 A1* | 8/2010 | Rolia | G06Q 10/06 717/135 |
| 2011/0213508 A1* | 9/2011 | Mandagere | G06F 1/3203 700/291 |
| 2012/0303344 A1* | 11/2012 | Cruz | G06F 17/5009 703/9 |
| 2013/0006426 A1* | 1/2013 | Healey | H05K 7/20836 700/278 |

OTHER PUBLICATIONS

Power Solutions, "Data Center Cooling Analysis using Computational Fluid Dynamics", Apr. 2012, 2 pages.
Eaton Corporation, "Airflow Management Solutions" Oct. 2011, 16 pages.
Great Lakes Case and Cabinet, "Computational Fluid Dynamic (CFD) Modeling of Containment Solutions" 2011, 32 pages.
Brent Goren in "Cold Aisle Containment System Performance Simulation", CAC Performance Simulation White Paper, Eaton Corporation, Mar. 2, 2011, 4 pages.
Dustin W. Demetriou, "Thermally Aware, Energy-Based Techniques for Improving Data Center Energy Efficiency" May 2012, Mechanical and Aerospace Engineering—Dissertations, Syracuse University, 399 pages.
Emad Samadiani, "Energy Efficient Thermal Management of Data Center via Open Multi-Scale Designs", Dec. 2009, Georgia Institute of Technology, Dissertation, 238 pages.
International Search Report for PCT/IN2013/000191, dated Jan. 23, 2014, 2 pages.

* cited by examiner

METHOD AND SYSTEM FOR DETERMINING AND IMPLEMENTING A VIABLE CONTAINMENT DESIGN OF A DATA CENTER

CROSS-REFERENCE TO RELATED APPLICATIONS AND PRIORITY

The present application claims priority from Indian Patent Application No. 1527/MUM/2012 filed on May 18, 2012 and from PCT/IN2013/000191 filed on Mar. 22, 2013, the entirety of which is hereby incorporated by reference.

FIELD OF THE INVENTION

The present invention relates to thermal management of a data center. Particularly the invention provides a method and system for determining a viable containment design of a data center and systematic implementation of the determined containment design in the data center.

BACKGROUND OF THE INVENTION

A computer data center contains a variety of equipments such as servers, telecommunication equipments, networking equipments, storage equipments, switches and other electronic equipments arranged in racks or frames.

The major challenge for a data center manager is to ensure appropriate cooling of various critical equipments at minimum electricity expenditure. The heat generated by electronic equipments in a data center is cooled with the help of cooling units, such as Computer Room Air Conditioners (CRAC) or Computer Room Air Handlers (CRAH). While implementing effective thermal management for equipment cooling, one of the challenging problems is to prevent the mixing of the cold air with the hot air before it reaches to servers, equipments and so on.

Various approaches have been attempted to address the equipments cooling problem, wherein most of the prior art relates to the computational fluid dynamics (CFD) simulation study. Yet most of them are related to the simulation for the cluster of racks or a part of the data center without considering the data center as a whole in an integrated way. The containment is the ultimate solution to address the above mentioned mixing problem, which has been suggested in the prior art. The containment design includes but is not limited to locations and placement of containment panels, perforated tile configurations, rack load distribution, blanking panel's location and placement, CRAC positions and so on. To effectively deal with equipments cooling problem related to mixing, various designs have been suggested in the prior art for the containment. However, if the containment is implemented without assessing it's viability in terms of cooling requirements of various equipment, it can result in hot spots and can put the equipment at risk. A methodology for systematic and risk free enablement of containment and for the selection of the optimal design of containment is yet to be addressed.

Hence there is a need for a method and system which could enable design of a viable containment, and help in its implementation. Some of the existing method and systems known to us are as follows:

Prior arts US2011/0108207A1, US2008/0181908A1, US2010/0188816A1, and 2010/0061057 A1, talks about containment panel placement and mostly related to intricacies of containment panel geometrical details.

Great Lakes Case and Cabinet in "Computational fluid dynamic (CFD) modeling of containment solutions" focuses on one particular containment design and finds that containment reduces the overall temperature of the data center. However, it does not provide a method or possible containment design for a particular data center. It merely provides the thermal and flow profile of the data center after the implementation of containment, and provides a general guideline for the containment.

Goren in "Cold aisle containment system performance simulation" and Hilss and Iyer in "Improved data center efficiency—incorporating air stream containment" are focusing on placement of the containment geometry/system. A number of containment geometries for the cold and the hot aisle containment have been suggested. However, the prior art is lacking in figuring out the actual implementation of the containment design without rigorous consideration of its impact on the thermal and flow profile which could affect server performance and may even lead to failure.

A large number of researchers have used CFD based methodology for design and operational optimization of data center. A review article by Rambo and Joshi also provides an excellent summary of such efforts.

The majority of prior art relates to carrying out the modeling either in a CFD, regression or a mixed modeling framework. Although some of the above prior arts deal with the energy efficiency in one or another way. They fail to disclose to disclose an efficient method and system for determining a viable containment design of a data center and systematic implementation of the determined containment design. Thus, in the light of the above mentioned background art, it is evident that, there is a need for a method and system that determines a viable containment design of a data center and provide a method for systematic implementation of the determined containment design.

SUMMARY OF THE INVENTION

Before the present methods, systems, and hardware are described, it is to be understood that this invention in not limited to particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention. In accordance with the present invention, the primary objective is to provide a method and system for enabling a viable containment design of a data center.

Another objective of the invention is to provide a CFD based method and system for appropriate selection of a viable containment design from various containment designs.

Another objective of the present invention is to provide design and operational recommendation for the viable containment design, wherein the design recommendations are selected from the group comprising of perforated tile positions, CRAC positions, and containment panel locations and operational recommendation are selected from the group comprising of possibility for increasing the set points, number of CRAC to be switch on and so on.

Another objective of the invention is to provide a method and system for comparing CFD simulations results of design parameters and operational parameters for each individual containment designs for determining a viable containment design, wherein the design parameters are selected from the group comprising of layout, geometrical details, blanking panels inside the racks, perforated tile positions and operational parameters are selected from the group comprising of CRAC set points, power details, thermal and flow values at some locations etc.

Another objective of the invention is to systematically provide a method and system for implementing the feasible recommendations considering the practical implementation issues of the determined containment design in a data center.

Another objective of the invention is to provide a method and system for collecting data pertaining to the design and operational parameters of the data center.

The present invention provides a method and system for determining a viable containment design of a data center and systematic implementation of the determined containment design in the data center. The containment design includes but is not limited to locations and placement of containment panels, perforated tile configurations, rack load distribution, blanking panels location and placement, CRAC positions and so on.

In an embodiment of the invention a method and system is provided for comparing virtual CFD simulations results of design and operational parameters of the data center for each individual containment design for determining a viable containment design and provide a set of design and operational recommendation for the implementation of the determined containment design. The design parameters are selected from the group comprising of layout, geometrical details, blanking panels inside racks, perforated tile positions and operational parameters are selected from the group comprising of CRAC set points, power details, thermal and flow values at some locations. The design recommendations are selected from the group comprising of perforated tile positions, CRAC positions, and containment panel locations. The operational recommendation are selected from the group comprising of possibility for increasing the set points, number of CRAC to be switch on.

There is a possibility that in a data center only a part of the recommendations can be implemented due to some implementation issues such as budget constraints, time required for implementations and so on. In an embodiment of the invention, a method and system is provided for re-evaluation of the determined viable containment design for refinement of the implementable recommendations considering the practical constraints faced by the data center.

In an embodiment of the invention, a system is also provided for determining a viable containment design and implementing the determined containment design of a data center. The system comprises of a Design and Operational Parameters Collection Module (300); a Containment Design Determination Module (400); and a Containment Design Implementation Module (500).

The above mentioned method and system are preferable for determining a viable containment design and assisting in the implementation of the determined containment design in a data center. However, this may also be used for many other applications.

BRIEF DESCRIPTION OF THE DRAWINGS

The foregoing summary, as well as the following detailed description of preferred embodiments, are better understood when read in conjunction with the appended drawings. For the purpose of illustrating the invention, exemplary constructions of the invention have been shown in the drawings. However, the invention is not limited to the specific methods and systems disclosed in the drawings. The description of the drawings is as follows.

DETAILED DESCRIPTION OF THE INVENTION

Figure 1:
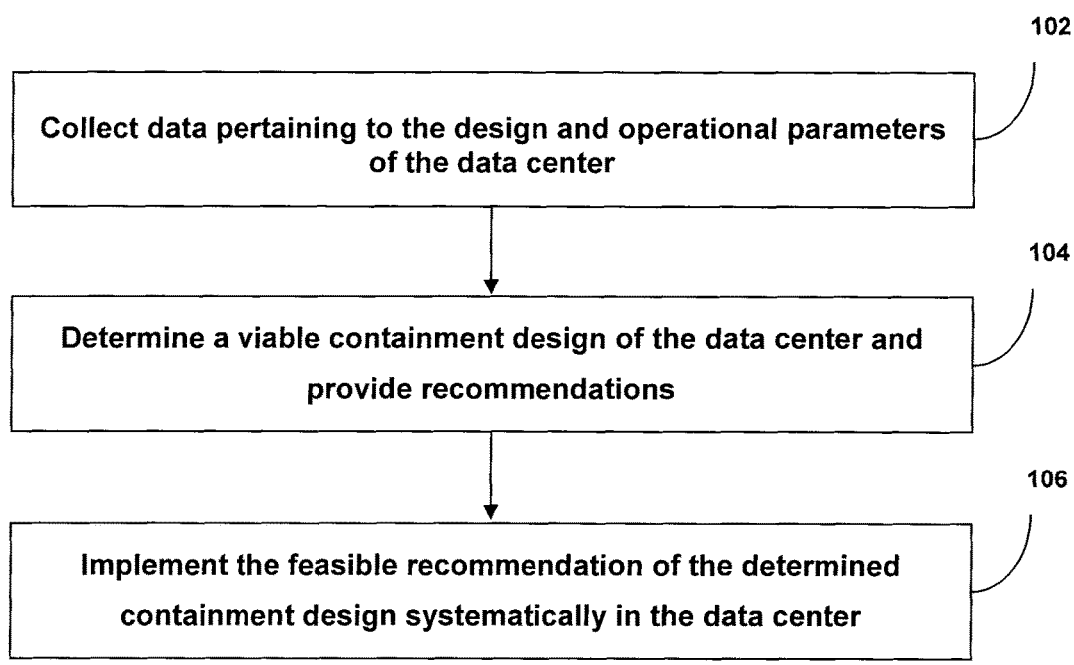
FIG. 1: shows a flow diagram of the method for determining and implementing a viable containment design of a data center.

The disclosed method and system for determining and implementing the viable containment design of a data center will now be discussed in further detail below.

The words 'comprising,' 'having,' 'containing,' and 'including,' and other forms thereof, are intended to be equivalent in meaning and be open ended in that an item or items following any one of these words is not meant to be an exhaustive list of such item or items, or meant to be limited to only the listed item or items.

It must also be noted that as used herein, the singular forms 'a,' 'an,' and 'the' include plural references unless the context clearly states otherwise. Although any systems and methods similar or equivalent to those described herein can be used in the practice or testing of embodiments of the present invention, the preferred systems and methods are now described.

The disclosed embodiments are merely exemplary of the invention, which may be embodied in various forms.

The present application provides a method for determining a viable containment design of a data center and systematic implementation of the determined containment design in the data center using a computational fluid dynamics (CFD) based virtual simulation, the method comprises of processor implemented steps of:

a. collecting data pertaining to a plurality of design and operational parameters of the data center using a Design and Operational Parameters Collection Module (300);

b. performing CFD simulations for collected design and operational parameters' data for each individual containment design, determining a viable containment design of the data center by comparing CFD simulation results of various containment designs and providing a set of recommendations for the viable containment design implementation using a Containment Design Determination Module (400); and c. re-evaluating the determined viable design using Containment Design Determination Module (400) iteratively considering practical implementation as one of the parameter for re evaluation for refining the recommendations and further implementing the refined recommendations of the determined containment design in the data center, systematically using a Containment Design Implementation Module (500).

The present application provides a system for determining a viable containment design of a data center and systematic implementation of the determined containment design in the data center, wherein the system comprising of:

a. a Design and Operational Parameters Collection Module (300); adapted to collect data pertaining to a plurality design and operational parameters of the data center;

b. a Containment Design Determination Module (400); adapted to perform CFD simulations for collected design and operational data for each individual containment design, determine a viable containment design of the data center by comparing CFD simulation results of various containment designs and provide a set of recommendations for the viable containment design implementation; and c. a Containment Design Implementation Module (500); adapted to re-evaluate the determined viable design using Containment Design Determination Module (400) iteratively with due consideration of the practical implementation for refining the recommendations and further implement the refined recommendations of the determined containment design in the data center, systematically.

The invention provides a method and system for determining a viable containment design of a data center and providing recommendations for the implementation of the determined containment design. The invention also provides a systematic implementation method and system for re-evaluation of the determined containment design and refinement of the recommendations by considering practical implementation issues.

Referring to FIG. 1 is a flow diagram for method for determining and implementing a viable containment design of a data center.

The process starts at step 102, where data pertaining to the design and operational parameters of the data center is collected. In step 104, a viable containment design of the data center is determined and recommendations are provided. The process ends at step 106, with systematic implementation of a set of feasible recommendations of the determined containment design in a data center.

Figure 2:
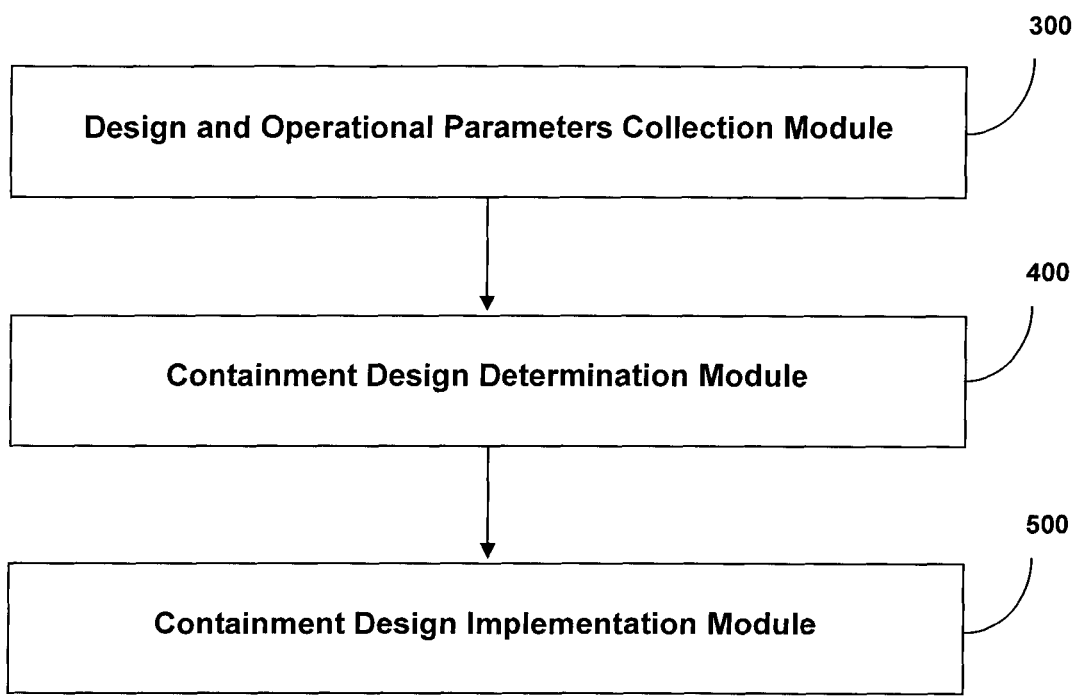
FIG. 2: shows a system diagram for determining and implementing a viable containment design of the data center.

Referring to FIG. 2 is a system diagram for determining and implementing a viable containment design of the data center.

In an embodiment of the invention, a system is provided for determining and implementing a viable containment design of a data center, wherein the system comprises of a Design and Operational Parameters Collection Module (300); a Containment Design Determination Module (400); and a Containment Design Implementation Module (500).

In an embodiment of the invention, the Design and Operational Parameters Collection Module (300) is adapted to collect data pertaining to the design and operational parameters of the data center wherein the design parameters are selected from the group comprising of layout, geometrical details, blanking panels inside racks, perforated tile positions and operational parameters are selected from the group comprising of CRAC set points, power details, thermal and flow values at some locations. The Containment Design Determination Module (400) is adapted to compare CFD simulations results of operational parameters of the data center for each individual containment design for determining a viable containment design. The Containment Design Implementation Module (500) is adapted to implement the determined containment design in the data center systematically by using the computational fluid dynamics (CFD) based virtual simulation.

Figure 3:
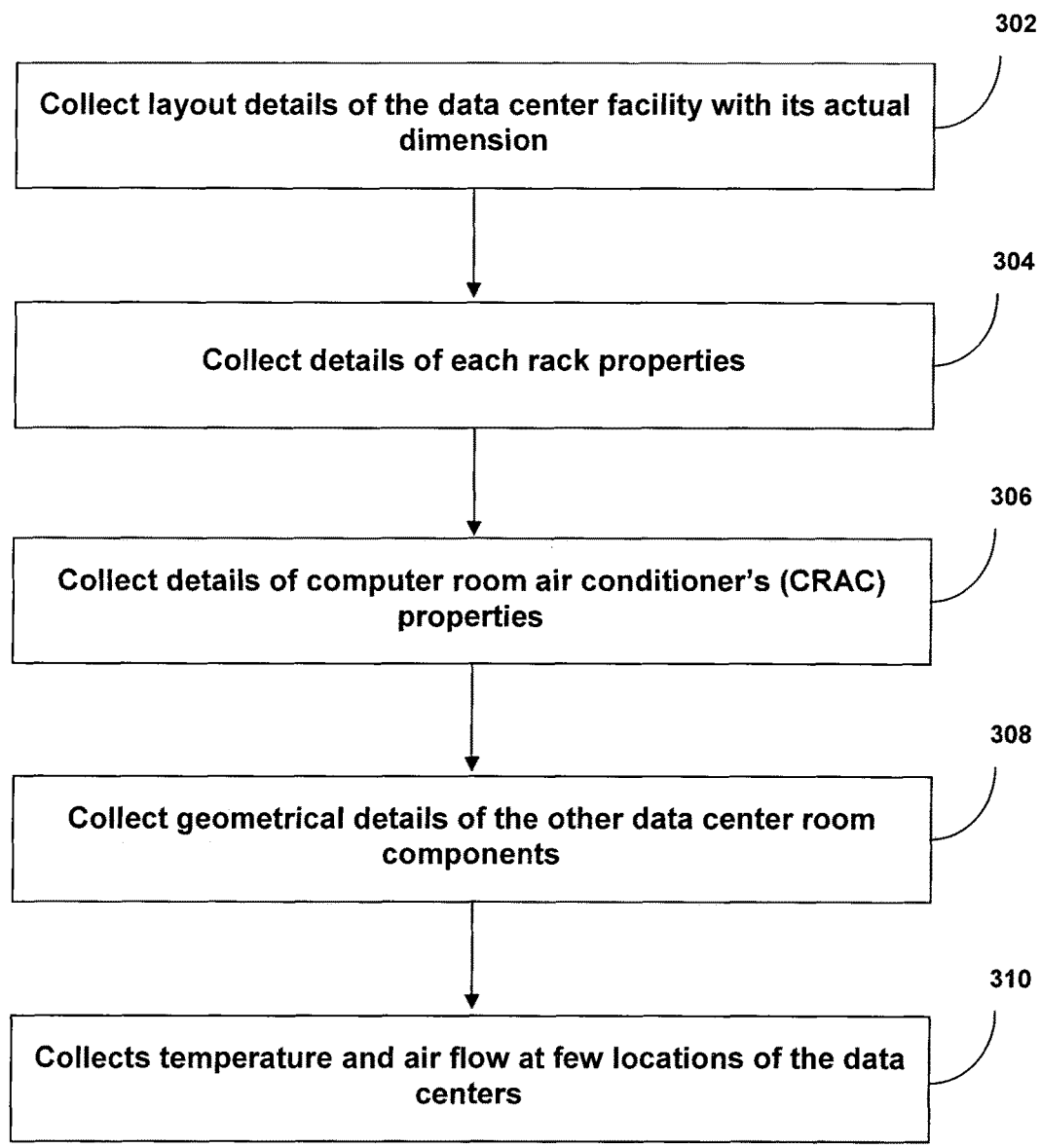
FIG. 3: shows a flow diagram of the method for collecting design and operational parameter's data of the data center.

Referring to FIG. 3 is a flow diagram of the method for collecting data pertaining to design and operational parameters of the data center.

In an embodiment of the invention, a method is provided for collecting data pertaining to design and operational parameters of the data center using the Design and Operational Parameters Collection Module (300). The method is provided for collecting data pertaining to the design and operational parameters of the data center wherein the design parameters are selected from the group comprising of layout, geometrical details, blanking panels inside racks, perforated tile positions and operational parameters are selected from the group comprising of CRAC set points, power details, thermal and flow values at some locations.

The process starts at step 302, layout details of the data center facility are collected with its actual dimension, wherein this layout of the data center and geometrical details of all equipments are collected. In step 304, details of each rack properties such as the rack power, rack openings (front and back or front and top) and so on are collected. In step 306, details of CRAC properties are collected. Wherein, CRAC details such as its model number, capacity, geometrical details and flow capacity, etc. are collected. In step 308, geometrical details of other data center room components are collected. Wherein, the building geometrical details such as wiring diagrams, beams position and columns positions and so on are collected. The process ends in step 310, in which, temperature and air-flow at few locations in the data center are measured.

Figure 4:
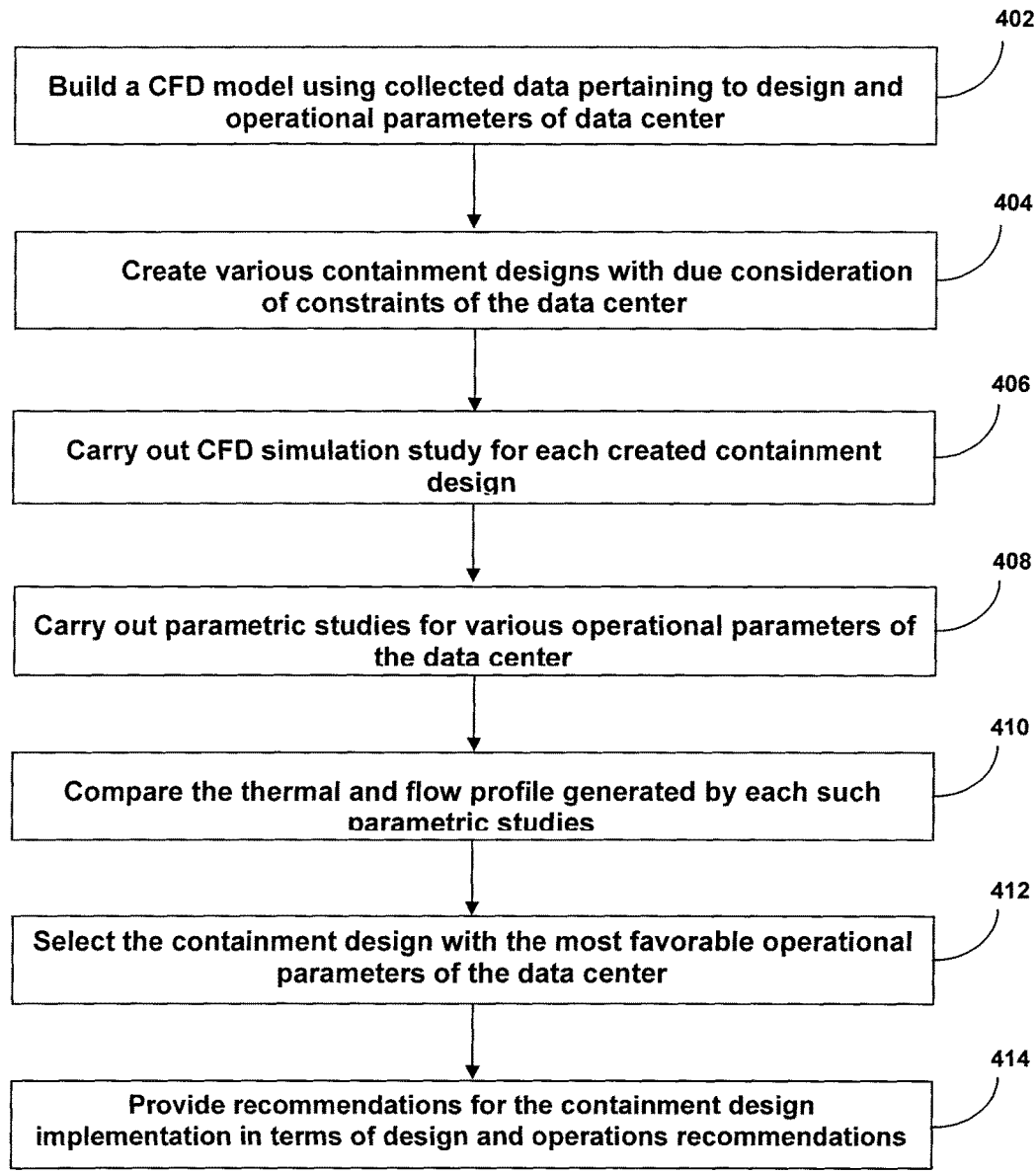
FIG. 4: shows a flow diagram of the method for determining a viable containment design and providing the recommendations for its implementation in the data center.

Referring to FIG. 4 is a flow diagram of the method for determining a viable containment design and providing the recommendations for its implementation in the data center.

In an embodiment of the invention, a method is provided for determining a viable containment design of the data center by comparing virtual CFD simulation results of operational parameters of the data center and its scope for moderation for each individual containment design for determining the viable containment design using the Containment Design Determination Module (400). The operational parameters are selected from the group comprising of CRAC set points, power details, thermal and flow values at some locations, perforated tile positions.

The Containment Design Determination Module (400) utilizes a CFD simulation study dealing with the containment design for the data center. The containment reduces mixing of the cold air with the hot air in the data center substantially which therefore leads to the efficient cooling. The method is provided for determining the viable containment design which required a special provision for CFD simulation as containment leads to blockage of air flow in a confined area. Confining of airflow generates problem of flow scarcity at certain locations which otherwise can be met by the surrounding air. This problem can be virtually visualized through CFD in an efficient way and rectified accordingly.

The process starts at step 402, where a CFD model is build using collected data pertaining to design and operational parameters of the data center. The CFD model is built to virtually calculate the thermal and flow profile of the data center without containment and also with various containment geometries. The CFD model is the combination of the geometry and configuration of the data center, the created mesh for the numerical simulations, the simulation solver and the post processor for the comparison of the simulations. Further, the CFD model thermal output is also validated with the existing data center measured temperature details for tuning the CFD model. At step 404, various containment geometries are created with due consideration of design and operational constraints of the data center. The containment geometry may include various combinations of cold aisle/hot aisle according to the data center feasibility. Containment geometries are created in the CFD model by adding containment panels. During the creation of containment geometries various design and operational constraints of the data centers are considered. The constraints may include difficulty of placement of panels, aesthetic look of the data center, capacity requirement and its fulfillment at contained area, human working conditions after containment, time requirement for restoration of cooling in case of any failure and so on. These constraints can be prioritized by conducting discussion with the data center managers. At step 406, CFD simulation studies are carried out for each of the created containment geometries in combination with various design parameters which is then termed as containment design. The design parameters of the data center are selected from the group comprising of layout, geometrical details, blanking panels inside racks, perforated tile positions. The containment design includes but is not limited to locations and placement of containment panels, perforated tile configurations, rack load distribution, blanking panel's location and placement, CRAC positions and so on. CFD simulations for each of the containment designs are performed to get the thermal and flow profiles of the data center. At step 408, parametric studies for each containment design and data center's various operational parameters are carried out for determining the best possible operating parameters for that particular design. Parametric studies are related to operational parameters, wherein the operational parameters are selected from the group comprising of CRAC set points, power details, thermal and flow values at some locations. At step 410, operating parameters of each containment design such as CRAC set points and its moderation possibility, power details, thermal and flow values at some locations, by each such parametric studies are compared to obtain the best possible operational parameters for each containment design. Uniformity index is calculated to check the variability of the temperature inside the containment. Uniformity index is the root mean square value of the rack temperatures. At step 412, the containment design with favorable operational parameters of the data center is selected. The favorable operational parameters of each containment design are compared and the design with most favorable parameters is selected as a viable containment design of the data center. The process ends at step 414, recommendations are provided for a viable containment design implementation in terms of design and operations. The recommendations may comprise of design recommendations selected from the group comprising of perforated tile positions, AC positions, and containment panel locations and operational recommendation selected from the group comprising of possibility for increasing the set points, number of CRAC to be switched on.

Figure 5:
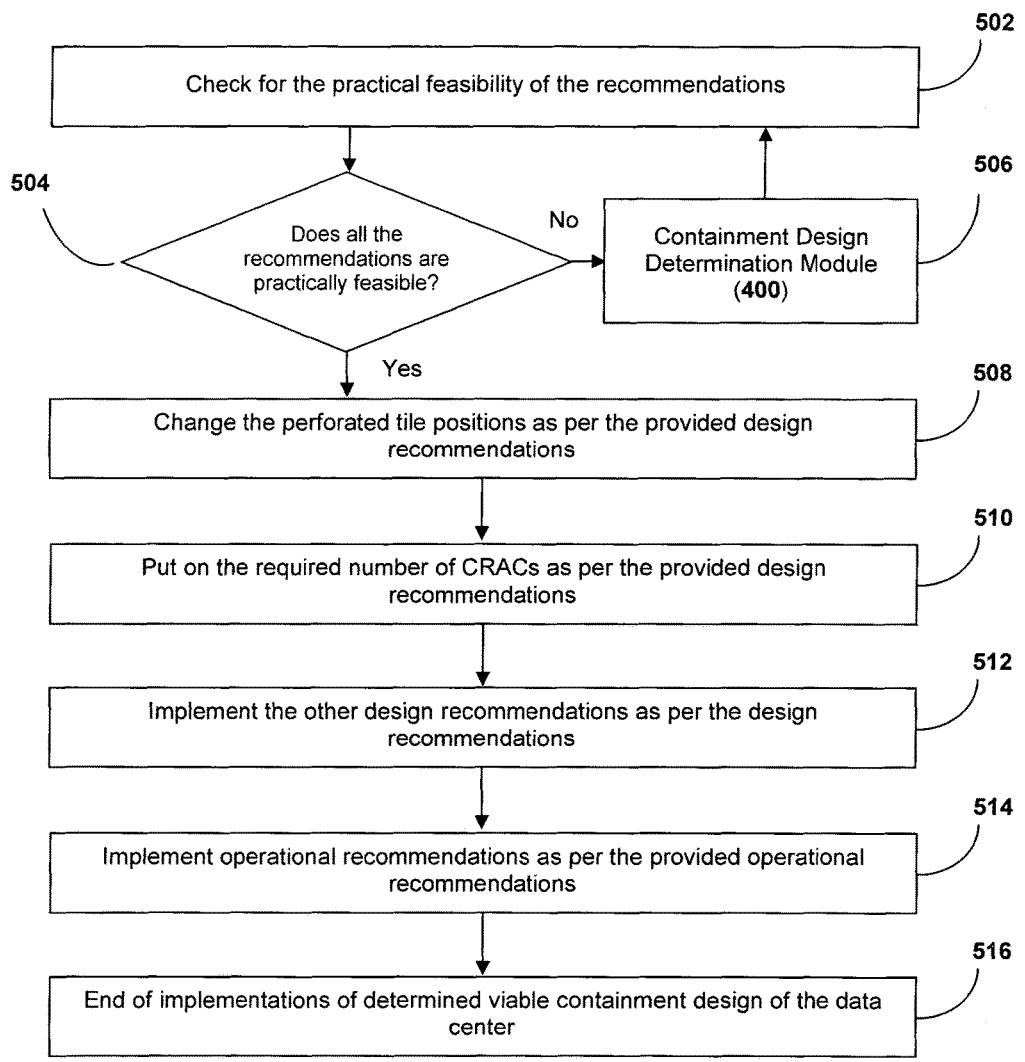
FIG. 5: shows a flow diagram of the method for implementation of the recommendations of the determined containment design of the data center.

Referring to FIG. 5 is a flow diagram of the method for implementation of the recommendations of the determined containment design of the data center.

In an embodiment of the invention, a method is provided for re-evaluating the earlier determined viable design with due consideration of the practical implementation issues and thus refining the recommendations. Further, implementation of the refined recommendations is carried out using the Containment Design Implementation Module (500). The method also provides a process for implementation of the determined containment designs in a step by step manner.

The process starts at step 502, where the practical feasibility of the recommended containment designs is checked. Practical issues can be of various types such as investment amount, difficulty in shifting of CRAC locations, large shut down time requirements and so on. At step 504, it is checked whether all the recommendations are practically feasible or not. Once feasible implementations are decided and are different from recommended implementations, the process is sent back to the Containment Design Determination Module (400) at the Step 506 for re-evaluation and refinement of the recommendations by considering the practical implementable issues. Recommendations thus arrived at are implemented in a phased manner. At the step 508, perforated tile positions are implemented first as the design recommendations. At the step 510, the required numbers of CRACs are switched on next as per the design recommendations. At step 512, implementation of rest of the design recommendations are performed. At step 514, operational recommendations are implemented as per containment design operational recommendations. The process ends at step 516, where the implementations of determined viable containment design of the data center is ended.

Figure 6:
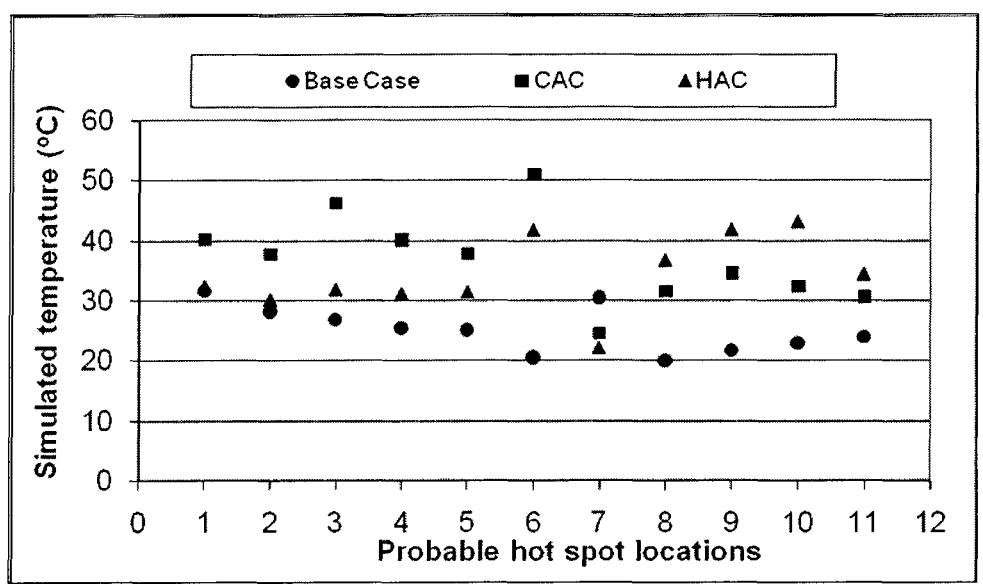
FIG. 6: shows a chart depicting simulated temperatures with/without containments at hot spot prone for the example data center.
Figure 7:
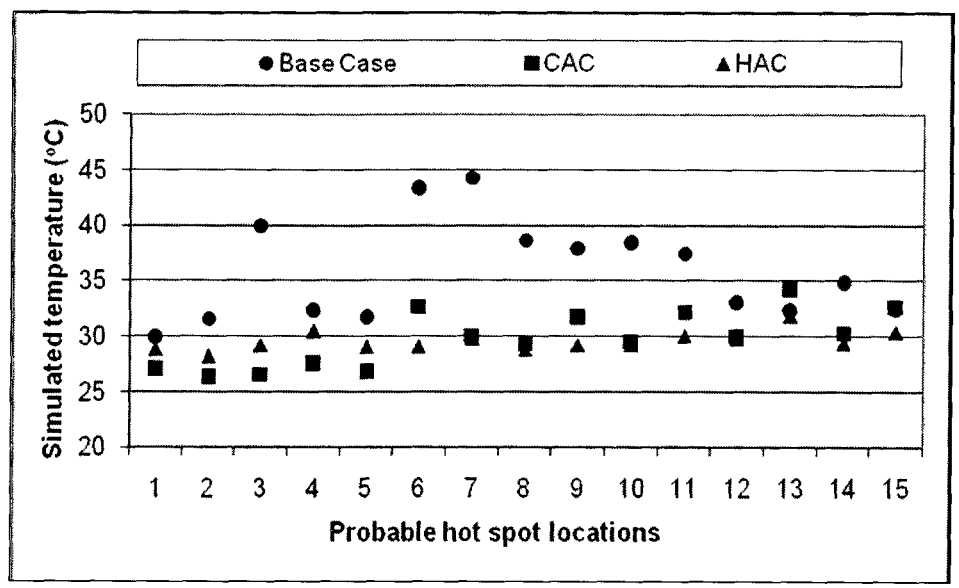
FIG. 7: shows a chart depicting simulated temperatures with/without containments at hot spot prone locations after changing operating conditions of the example data center.

Referring to FIG. 6 is a chart depicting simulated temperatures with and without containments at hot spot prone locations for the example data center. It shows simulated temperatures with and without containment geometry at hot spot prone locations keeping other design parameters unchanged. Referring to FIG. 7 is a chart depicting simulated temperatures for cases with and without containments at hot spot prone locations after changing operating conditions of the example data center. FIG. 6 and FIG. 7 are illustrative results for the example data center.

The comparison of air temperatures at hot spot prone locations is shown in FIG. 6. The comparisons are made between the base case scenarios (i.e., as per the existing operating conditions), the cold aisle containment design and the hot aisle containment design. The overall temperature profile (not shown here) of the data center improves except at few locations. The chart illustrates that temperatures at these locations are higher for the containment case compared to the base case. The reason for this could be traced to unavailability of sufficient air flow at these rack locations as compared to the base case. When containment is not considered, these racks can get air from surrounding locations (hot or cold), which is not the case when containment is implemented. Therefore, containment cannot be performed without due considerations of thermal profiles upon implementation of containment. Virtual thermal simulation study allows changes in design and operational parameters so as to overcome hot spots arising out of initial containment designs.

The air temperature comparison is shown in FIG. 7. Both hot and cold aisle containment designs give better temperature response compared to the base case, i.e., the case without any containment and the maximum temperature is relatively lower for both the containment cases. Moreover, the hot aisle containment (HAC) is relatively better as revealed from temperature profiles. This is one viable configuration. In similar way several viable containment designs can be obtained and the best viable design is selected.

The machine may comprise a server computer, a client user computer, a personal computer (PC), a tablet PC, a laptop computer, a desktop computer, a control system, a network router, a switch or a bridge, or any machine capable of executing a set of instructions (sequential or otherwise) that specify actions to be taken by that machine. Further, while a single machine is illustrated, the term 'machine' shall also be considered to include any collection of machines that individually or jointly execute a set (or multiple sets) of instructions to perform any one or more of the methodologies discussed herein.

The machine may include a processor (for example, a central processing unit (CPU), a graphics processing unit (GPU), or both, a main memory and a static memory, which communicate with each other through a bus. The machine may further include a video display unit (for example, a liquid crystal displays (LCD), a flat panel, a solid state display, or a cathode ray tube (CRT). The machine may include an input device (for example. a keyboard) or touch-sensitive screen, a cursor control device (for example, a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to kale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

The present invention provides a solution for those issues which are sometimes unknowingly generated by performing containment without proper study, such as insufficiency of the cold air at certain racks by changing some operational parameters which is found through CFD study; reducing the chances of air pressure build up due to excess air supply and low flow requirement by systematic implementation; and provides a method for efficient operation of the data center leading to energy savings without the danger of equipment failure.

The present invention utilizes the CFD based methodology, which virtually examines the thermal and flow profile of the data center for various containment designs.

The present invention provides various parametric studies to be performed to get the preferable design and operational parameters of the data center and compares these parameters for various containment designs, and thus shows a way to get a viable containment design. It then provides the design and operational recommendations to the data center which needs to be implemented.

The present invention provides a systematic method for implementing the determined containment design in a production data center by implementing the obtained recommendations.

We claim:

1. A method for determining a viable containment design of a data center and systematic implementation of the determined containment design in the data center using a computational fluid dynamics (CFD) based virtual simulation, the method comprises steps of:

collecting, by a processor, data pertaining to a plurality of design and operational parameters of the data center using a Design and Operational Parameters Collection Module;

performing, by the processor, CFD simulations for collected design and operational parameters' data for each individual containment design thereby determining a viable containment design of the data center by comparing CFD simulation results of various containment designs and providing a set of recommendations for the viable containment design implementation using a Containment Design Determination Module; and implementing, by the processor, the set of recommendations of the determined containment design in the data center, systematically using a Containment Design Implementation Module, wherein recommendation of the determined viable containment design is systematically implemented in the data center comprising implemented steps of:

checking each of the recommendations for their practical implementation feasibility;

re-evaluating the containment design using the containment design determination module for getting refined recommendations if all the recommendations are not feasible for implementations;

building a CFD model using collected data pertaining to design and operational parameters of the data center;

comparing thermal and flow profiles generated by each parametric study thereby obtaining the operational parameters for each containment design and calculating uniformity index to check the variability of temperature inside the containment, wherein the uniformity index is the root mean square value of rack temperature; and physically implementing the design recommendations, in the data center, in a phased manner where the recommendation is feasible, wherein perforated tile positions are implemented first followed by switching on required number of design Computer Room Air Conditioners (CRACs) as per the design recommendation followed by implementation of other design recommendations and the operational recommendations.

2. The method as claimed in claim 1, wherein the design parameters of the data center are selected from the group comprising of layout, geometrical details, blanking panels inside racks, perforated tile positions and operational parameters of the data center are selected from the group comprising of CRAC set points, power details, thermal and flow values at some locations.

3. The method as claimed in claim 1, wherein the set of recommendations comprises of design recommendations selected from the group comprising of perforated tile positions, CRAC positions, and containment panel locations and operational recommendation selected from the group comprising of possibility for increasing the set points, number of CRAC to be switched on.

4. The method as claimed in claim 1, wherein the collected data pertaining to the design and operational parameters of the data center is selected from the group comprising of layout details of the data center facility with its actual dimensions and geometrical details of all equipments present in data center; rack properties including rack power and rack opening details such as front and back or front and top; CRAC properties such as its model number, capacity, geometrical details and flow capacity; and details of wiring diagrams, beam's position, and columns position in the data center.

5. The method as claimed in claim 1, wherein a viable containment design is determined by processor implemented steps of:
   creating various containment designs with due consideration of design and operational constraints of the data center;
   carrying out CFD simulation studies for each created containment design for obtaining thermal and flow profile of the data center;
   carrying out parametric studies for various operational parameters of the data center; and
   selecting containment design with most favorable operational parameters of the data center.

6. The method as claimed in claim 1, wherein the CFD model is built to virtually calculate the thermal and flow profile of the data center with and without various containment designs.

7. The method as claimed in claim 1, wherein the containment design includes locations and placement of containment panels, perforated tile configurations, rack load distribution, blanking panel's location and placement, CRAC positions and combinations thereof.

8. The method as claimed in claim 5, further comprises of validating the CFD model thermal output and tuning of the CFD model with the temperature measured in the existing data center and air flow details.

9. The method as claimed in claim 1, wherein the containment designs includes cold aisle containment geometry, hot aisle containment geometry or a combination of both.

10. The method as claimed in claim 1, wherein the containment designs are created in the CFD model by applying containment panels.

11. The method as claimed in claim 5, wherein the design and operational constraints are selected from the group comprising of difficulty of placement of panels and aesthetic look of the data center.

12. The method as claimed in claim 5, wherein the containment reduces mixing of cold air with hot air before reaching the servers in the data center substantially for efficient cooling.

* * * * *